United States Patent [19]

Wilkinson

[11] Patent Number: 5,491,479
[45] Date of Patent: Feb. 13, 1996

[54] 8B-16B RLL DECODER WITH HAMMING DISTANCE DETECTION

[75] Inventor: James H. Wilkinson, Tadley, United Kingdom

[73] Assignees: Sony Corporation, Tokyo, Japan; Sony United Kingdom Ltd., Middlesex, England

[21] Appl. No.: 114,826

[22] Filed: Sep. 2, 1993

[30]    Foreign Application Priority Data

Sep. 17, 1992 [GB] United Kingdom .................. 9219716
Nov. 3, 1992 [GB] United Kingdom .................. 9223017

[51] Int. Cl.⁶ .................................................. H03M 7/00
[52] U.S. Cl. .............................. 341/58; 341/59; 341/94
[58] Field of Search .............................. 341/58, 59, 73, 341/74, 75, 94, 106

[56]    References Cited

U.S. PATENT DOCUMENTS 4,593,395  6/1986  Schouhamer Immink et al. ...... 371/40
5,198,813  3/1993  Isozaki ..................................... 341/59

FOREIGN PATENT DOCUMENTS

0129849  1/1985  European Pat. Off. .
0140381  5/1985  European Pat. Off. .
0156413  10/1985  European Pat. Off. .

*Primary Examiner*—Howard L. Williams
*Attorney, Agent, or Firm*—William S. Frommer; Alvin Sinderbrand

[57]    ABSTRACT

Apparatus for decoding an input digital signal by replacing successive n-bit groups of the input digital signal with respective ones from an ensemble of m-bit data words, each m-bit data word having an associated n-bit code word, where n is greater than m, comprises: means for determining the Hamming distance between an n-bit group of the input digital signal and each of the n-bit code words associated with the ensemble of m-bit data words; and means for replacing that n-bit group of the input digital signal with an m-bit data word from the ensemble of m-bit data words for which the Hamming distance between the n-bit code word associated with that m-bit data word and that n-bit group is the lowest.

13 Claims, 6 Drawing Sheets

8B-16B RLL DECODER WITH HAMMING DISTANCE DETECTION

BACKGROUND OF THE INVENTION

1. Field of the Invention

This invention relates to data coding.

2. Description of the Prior Art

Channel coding is employed in digital magnetic recording apparatus such as digital video tape recorders (DVTRs) in order to match the frequency spectrum of data to be recorded to the frequency response of the recording medium. For example, a previously proposed DVTR employs a channel code (a so-called 8:16 code) to map 8-bit data words onto 16-bit code words before the code words are recorded onto a magnetic tape medium. The code words generated by the channel code obey a number of rules relating to the maximum runlength of a single binary value (to control the low frequency content of the coded data), the minimum runlength of a single binary value (to control the high frequency content of the coded data) and the balance between ones and zeroes (to control the dc content of the coded data).

In the 8:16 code, each of the 256 possible 8-bit data words has two complementary corresponding 16-bit codes for recording on the tape medium. This means that there are 512 valid 16-bit codes out of a possible $2^{16}$ (65536) permutations. In the previously proposed DVTR mentioned above, if a 16-bit replayed group does not correspond to one of the 512 valid codes (for example due to a replay data error), then that code is simply flagged as being erroneous.

SUMMARY OF THE INVENTION

It is an object of the invention to improve the coding and decoding of data.

Viewed from a first aspect this invention provides apparatus for decoding an input digital signal comprising successive n-bit groups of data bits by replacing said successive n-bit groups with respective ones from an ensemble of m-bit data words, each said m-bit data word having at least one associated valid n-bit code word, where n is greater than m, said apparatus comprising:

means for determining a Hamming distance between a current n-bit group of said input digital signal and each of said valid n-bit code words; and means for replacing said current n-bit group with an m-bit data word from said ensemble of m-bit data words for which said Hamming distance between a valid n-bit code word associated with said m-bit data word and said current n-bit group is the lowest.

The invention makes use of the redundancy available in an m:n channel code, where n>m, to allow a 'maximum likelihood' type of detection of the n-bit groups. Instead of merely discarding an n-bit group which does not match any of the valid n-bit codes, the most likely valid n-bit code is determined by checking the Hamming distance (the number of differing bits) between the n-bit group and the valid n-bit codes.

Preferably the apparatus comprises means for detecting whether two or more of the valid n-bit code words have the lowest Hamming distance from the current n-bit group. This information can be used by means, responsive to a detection that two or more of the valid n-bit code words have the lowest Hamming distance from the current n-bit group, for detecting whether the lowest Hamming distance is equal to one and, if so, for replacing the current n-bit group with an m-bit data word associated with one of the two or more valid n-bit code words having the lowest Hamming distance from the current n-bit group.

In order to select one of a plurality of valid n-bit code words having an equally low Hamming distance from the current n-bit group, a preferred embodiment comprises means, responsive to a detection that the lowest Hamming distance is not equal to one, for detecting the bit separation of bit differences between the current n-bit group and the two or more valid n-bit code words; and the means for replacing comprises means for replacing the current n-bit group with an m-bit data word for which the bit separation between a valid n-bit code word associated with that m-bit data word and the current group is the lowest. In this way a valid n-bit code word is selected for which the bits differing from the current n-bit group are most closely spaced, on the assumption that the errors arose from a short duration burst error.

In a preferred embodiment, n is 16 and m is 8. In this case it is preferred that the ensemble of m-bit data words comprises 256 discrete 8-bit data words.

In order for the valid n-bit code words to satisfy constraints relating to the frequency response of, for example, a magnetic recording channel, it is preferred that each valid n-bit code word associated with an m-bit data word has a maximum run length of $L_{max}$ and a minimum run length of $L_{min}$. In particular, it is preferred that $L_{max}$ is 6 and $L_{min}$ is 2.

Although the apparatus may be embodied as, for example, a discrete logic circuit or an application specific integrated circuit (ASIC), an advantageously simple embodiment of the apparatus comprises a read only memory (ROM); means for supplying the current n-bit group as an n-bit address to the ROM; and means for reading an m-bit data word from that n-bit address in the ROM for use in replacing the current n-bit group. In this way, the processing of the various permutations of n-bit groups can be carried out 'in advance', with the appropriate m-bit data word being obtained from a look-up table at the time that an n-bit group is received.

Preferably each m-bit data word from the ensemble of m-bit data words has two binary-complementary associated valid n-bit code words.

Viewed from a second aspect this invention provides a method of decoding an input digital signal comprising successive n-bit groups of data bits by replacing said successive n-bit groups with respective ones from an ensemble of m-bit data words, each said m-bit data word having at least one associated valid n-bit code word, where n is greater than m, said method comprising the steps of:

determining a Hamming distance between a current n-bit group of said input digital signal and each of said valid n-bit code words; and replacing said current n-bit group with an m-bit data word from said ensemble of m-bit data words for which said Hamming distance between a valid n-bit code word associated with said m-bit data word and said current n-bit group is the lowest.

It is known to employ differential (DPCM) encoding of data as part of a data compression system. In differential encoding successive data values are not transmitted or stored per se, but instead the difference between each data value and the preceding data value is used. This can lead to improved compression in a case where successive data values are of very similar value, since the differences between the successive data values will be small.

When differentially encoded data are reconstructed from the difference values, each reconstructed value depends on the preceding difference value and, by extension, on all previous difference values. Differential encoding therefore suffers from a disadvantage that if a data error occurs in a differentially encoded data stream, then all subsequently reconstructed data values will be in error. This makes differential encoding apparently unsuitable for use in applications such as magnetic data recording, in which data errors frequently occur.

Accordingly, viewed from a third aspect this invention provides apparatus for generating data blocks from successive data values of an input digital signal, said apparatus comprising:

a differential encoder for differentially encoding a plurality of successive data values of said input digital signal with respect to a first data value, to generate differentially encoded data values;

an entropy encoder for encoding said first data value and said differentially encoded data values, to form a data block; and means for generating an error detecting code from said data block and for association with said data block, for allowing detection of a data error in said data block.

According to this aspect of the invention, data to be differentially encoded are divided into discrete blocks. Each block comprises a first, non-differentially encoded, data value, a number of difference values and an error detecting code. On reconstruction of the data, if the error detecting code shows that the block contains a data error, the data from that block can be discarded with no effect on data in other blocks.

In a preferred embodiment the input digital signal comprises luminance and chrominance components of a representation of an image. In particular, it is preferred that the representation of the image comprises frequency-separated image data, such as wavelet, sub-band, or discrete cosine transform (DCT) encoded data.

Differential encoding is particularly advantageous when carried out on relatively highly correlated data. It is therefore preferred that the differential encoder is operable to differentially encode frequency-separated image data of less than predetermined horizontal and vertical spatial frequencies, which data tends to be more highly correlated than image data representing higher spatial frequencies.

In a preferred embodiment each data block comprises a luminance data section and a chrominance data section, the luminance and chrominance data sections representing corresponding portions of the luminance and chrominance components. Preferably the data blocks are each of a predetermined length.

In order that the differentially encoded data can have the same number of bits as the data before differential encoding, it is preferred that the differential encoder comprises means for subtracting a current data value from a preceding data value using modulo arithmetic in which carries are ignored, to generate a differentially encoded data value. Preferably the differential encoder uses modulo-$2^b$ arithmetic, where b is the number of bits in each data value of the input digital signal.

Viewed from a fourth aspect this invention provides a method of generating data blocks from successive data values of an input digital signal, said method comprising the steps of:

differentially encoding a plurality of successive data values of said input digital signal with respect to a first data value, to generate differentially encoded data values;

entropy encoding said first data value and said differentially encoded data values, to form a data block; and generating an error detecting code from said data block and for association with said data block, for allowing detection of a data error in said data block.

Viewed from a fifth aspect this invention provides apparatus for processing data blocks, to generate successive data values of an output digital signal, said apparatus comprising:

error detecting means responsive to error detecting codes associated with said data blocks, for detecting whether said data blocks contain one or more data errors;

an entropy decoder for decoding from each data block not containing a data error a first data value and a plurality of differentially encoded data values; and a differential decoder for differentially decoding said plurality of differentially encoded data values with respect to said first data value, to generate said successive data values of said output digital signal.

In addition to its error-detecting function, it is preferred that the error detecting means comprises means for correcting errors of up to a predetermined length in the data blocks. Data blocks having such relatively minor errors can thereby be rendered error-free, for processing by the differential decoder.

Data blocks containing errors are not decoded by the differential decoder, so it is preferred to employ means for replacing data blocks containing one or more data errors with concealment data values.

Viewed from a sixth aspect this invention provides a method of processing data blocks, to generate successive data values of an output digital signal, said method comprising the steps of:

detecting whether said data blocks contain one or more data errors, in response to error detecting codes associated with said data blocks;

entropy decoding from each data block not containing a data error a first data value and a plurality of differentially encoded data values; and differentially decoding said plurality of differentially encoded data values with respect to said first data value, to generate said successive data values of said output digital signal.

The invention may be advantageously employed in digital video record/replay apparatus.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
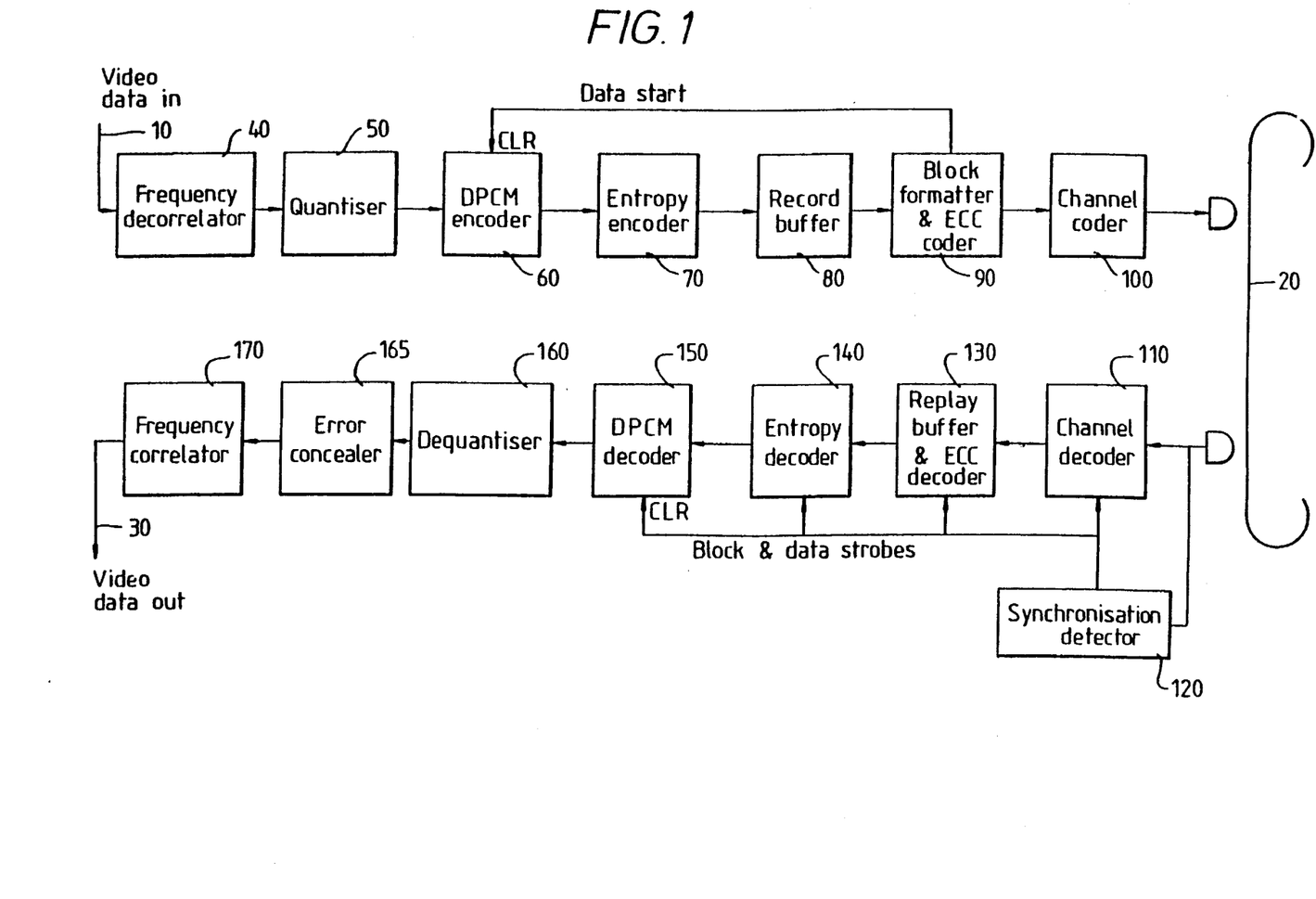
FIG. 1 is a schematic block diagram of a digital video tape recorder.

Referring now to FIG. 1, a schematic block diagram of a digital video tape recorder (DVTR) is shown in which an input video signal 10 is subject to data compression and block formatting before being recorded on a magnetic tape medium 20. Similarly, data recovered from the tape medium 20 are subjected to complementary decompression processing before being output as an output video signal 30.

The input video signal 10 is first supplied to a frequency decorrelator 40 which includes banks of horizontal and vertical finite impulse response filters that serve to split and decimate the data into respective frequency-transformed images comprising sub-band components in the two-dimensional spatial frequency domain. Data representing the frequency-transformed images are supplied from the frequency decorrelator 40 to a quantizer 50 in which the data are subjected to lossy quantization. The quantized data are then passed, in the form of 12-bit data samples, to a differential pulse code modulation (DPCM) encoder 60, the operation of which will be described further below. Data from the DPCM encoder 60 are passed, again in the form of 12-bit data samples, to an entropy encoder 70 which employs runlength and Huffman coding to effect data compression. The output of the entropy encoder 70 comprises data words having a variable length in such a way that more commonly occurring data patterns within the data output by the DPCM encoder 60 are represented by shorter variable length data words.

The variable length data words output by the entropy encoder 70 are temporarily stored in a record buffer 80 before being formatted into fixed length "inner" data blocks by a block formatter and ECC coder 90. The block formatter and ECC coder 90 also appends an error correcting code ("ECC") to each inner data block, which code can be used on replay to detect data errors in that inner data block. The block formatter and ECC coder supplies a data start signal to the DPCM encoder 60 and the entropy encoder 70; the purpose of the data start signal will be described below.

The formatted inner data blocks output by the block formatter and ECC coder 90 are passed to a channel coder 100 in which successive 8-bit data words of the inner data blocks are coded into corresponding 16-bit code words. For this reason, the coding performed by the channel coder 100 is referred to as an 8:16 code. Channel coding is employed so that the encoded data has more desirable characteristics for recording on a magnetic medium. For example, magnetic media will not respond to the recording of dc components, which may arise because of long runs of ones or of zeros of the digital data to be recorded. Also, there is normally a frequency response limit in a replay channel so that replay of high-frequency components of a signal becomes unreliable. Thus, channel coding is employed to map the 8-bit data words of the inner data blocks onto 16-bit code words subject to constraints on the maximum transition width (the largest number of bits between adjacent transitions in the encoded data) and the minimum transition width (the minimum number of bits between adjacent transitions in the encoded data). The 16-bit code words output by the channel coder 100 are recorded serially along helical tracks of the magnetic tape medium 20.

Data replayed from the magnetic tape medium 20 are passed to a channel decoder 110 and a synchronisation detector 120. The synchronisation detector 120 detects the timing of the replayed data to regenerate a data strobe signal providing a clocking pulse corresponding to each data word of the replayed data. The synchronisation detector 120 also examines the replayed data to detect synchronisation information indicative of the start of each of the inner data blocks, and outputs a block strobe signal which comprises a series of strobe or clock impulses to mark the start of each inner data block. Generation of the block and data strobe signals by the synchronisation detector 120 is performed using a "fly-wheel" mechanism whereby the block and data strobe signals are continuously generated despite occasional replay data errors. The block and data strobe signals are supplied to a replay buffer and ECC decoder 130, an entropy decoder 140, and a DPCM decoder 150.

The operation of the channel decoder 100 will be described in more detail below, but basically the channel decoder performs an inverse mapping of 16-bit code words replayed from the tape medium 20 into corresponding 8-bit data words forming successive inner data blocks. The inner data blocks are subjected to ECC decoding by the replay buffer and ECC decoder 130, such that an error flag is associated with each inner data block to indicate whether that inner data block has been wholly successfully replayed. The replay buffer and ECC decoder 130 also performs error correction of short duration replay errors. Inner data blocks for which the error flag is not set, ie those which have been successfully replayed or which have been successfully corrected by the replay buffer and ECC decoder, are subjected to entropy decoding by the entropy decoder 140 and DPCM decoding by the DPCM decoder 150. Data output by the DPCM decoder 150 are passed to a dequantizer 160 in which an inverse of the quantizing operation performed by the quantizer 50 is carried out. The dequantized data are then passed to an error concealer 165, which conceals any data errors which were not corrected by the replay buffer and ECC decoder, and from there to a frequency correlator 170 which performs a complementary process to that of the frequency decorrelator 40. The output of the frequency correlator 170 comprises the output video signal 30.

Figure 2:
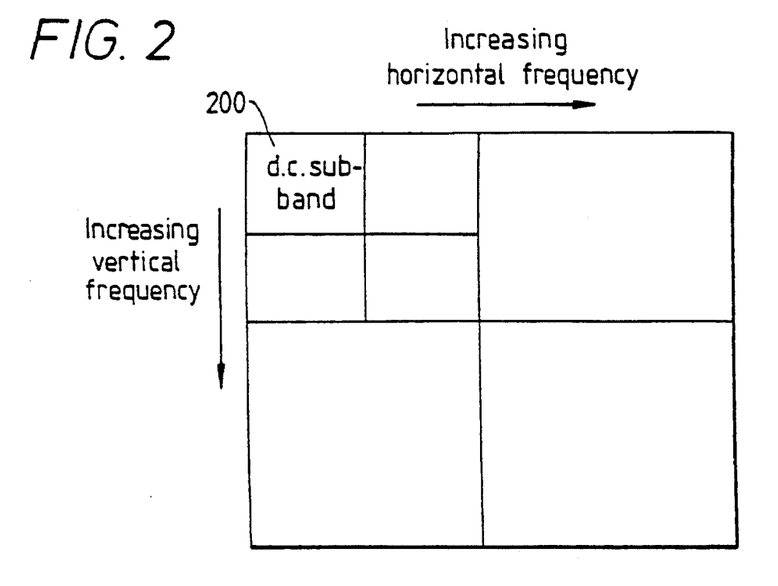
FIG. 2 is a schematic diagram showing frequency-separated image data.

FIG. 2 schematically illustrates the frequency separated image data output by the frequency decorrelator 40. In FIG. 2, increasing horizontal frequency in the two-dimensional spatial frequency domain is represented along a horizontal axis, and increasing vertical frequency is represented along a vertical axis. Moving rightwards and downwards in the representation of FIG. 2 corresponds to an increase in spatial frequency.

FIG. 2 shows the transformation of the input video signal into seven spatial frequency sub-bands. This is performed in the frequency decorrelator 40 by first subjecting the data to complementary low and high pass filtering in both the horizontal and vertical directions to split it into four primary equal-sized sub-bands in the spatial frequency domain. Of these four equal-sized sub-bands, the one representing the lowest horizontal and vertical spatial frequencies is then subjected to further filtering and splitting in both the horizontal and vertical directions to form four secondary sub-band components. The secondary sub-band representing lowest horizontal and vertical spatial frequency will be referred to as the dc sub-band 200, and occupies one sixteenth of the area in the spatial frequency domain. Depending on the spatial frequency range, the various sub-bands are subjected to differing degrees of quantization by the quantizer 50, so that in general, data representing higher frequency components in the two-dimensional spatial frequency domain is subjected to more severe quantization.

Figure 3:
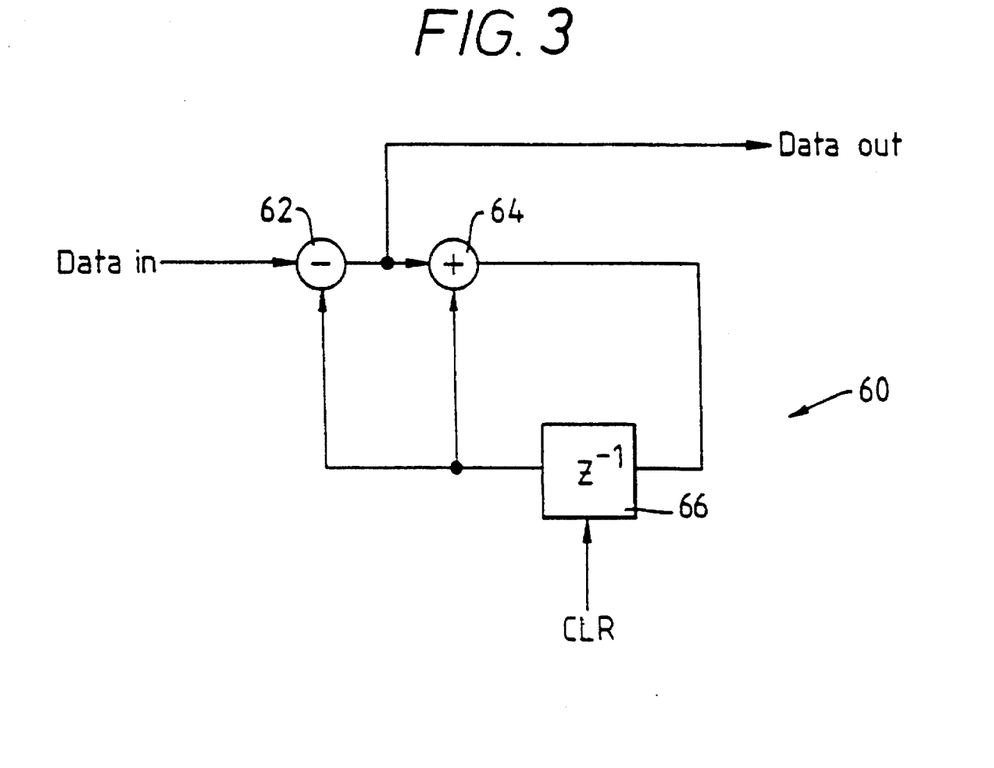
FIG. 3 is a schematic block diagram of a DPCM encoder.

FIG. 3 is a schematic diagram of the DPCM encoder 60, which comprises a subtracter 62, an adder 64, and a delay unit 66 connected in a feedback arrangement. In the present embodiment a 12-bit wide signal is supplied to the DPCM encoder, so that the adder 64 and the subtracter 62 operate according to modulo-$2^{12}$ (modulo-4096) arithmetic. (In general, modulo-$2^b$ arithmetic would be used for a b-bit wide signal, to ensure that DPCM codes generated by the DPCM encoder 60 have the same number of bits as the signal supplied to the DPCM encoder). Each 12-bit sample received by the DPCM encoder 60 is passed first to the subtracter 62, where the output of the delay unit 66 is subtracted (modulo-4096) from the current input 12-bit sample. The output of the subtracter 62 is supplied as a 12-bit output sample to the entropy encoder 70, and is also added (modulo-4096) to the output of the delay unit 66 by the adder 64, to regenerate the input sample. The regenerated input sample is delayed by one sample period by the delay unit 66, to be subtracted (modulo-4096) from the next input sample received by the subtracter 62.

A clear (CLR) signal applied to the delay unit 66 can be used to set the output of the delay unit 66 to zero. Setting this output to zero causes zero to be subtracted from the current input sample by the subtracter 62, which in turn means that the current input sample is passed directly to the entropy encoder 70 without being subjected to differential coding.

DPCM coding is particularly beneficial when applied to data having similar or identical successive values. In the present case, an increase in the compression performed by the entropy encoder 70 can be achieved by applying DPCM coding to the relatively highly correlated data of the dc sub-band 200. DPCM coding is not applied to the remainder of the sub-bands, so for data from these remaining sub-bands the CLR input of the delay unit 66 is permanently set, forcing the output of the delay unit 66 to be zero.

During, for example, shuttle (high-speed) replay of data stored on the tape medium 20, only certain of the inner data blocks may be successfully replayed. In order that in this situation each inner data block may be decoded independently of adjacently recorded inner data blocks, the first data sample of each inner data block is not subjected to DPCM coding, but instead is included in the inner data block in non-DPCM form. This is achieved by applying the data start signal from the block formatter and ECC coder 90 to the CLR input of the delay unit 66 (so that the output of the delay unit 66 is set to zero) for the first sample to be included in each inner data block. This operation is illustrated in the following table.

| PCM Samples | 8 | 4 | 7 | 9 | 3 | 1 | 12 | 2 | 6 | 7 | 9 | 5 |
|---|---|---|---|---|---|---|---|---|---|---|---|---|
| CLR signal | x | | | | | | | | | | | |
| DPCM Codes | 8 | 12 | 3 | 2 | 10 | 14 | 11 | 6 | 4 | 1 | 2 | 12 |
| Reconstructed | 8 | 4 | 7 | 9 | 3 | 1 | 12 | 2 | 6 | 7 | 9 | 5 |

The table illustrates (for simplicity) 4-bit DPCM coding applied to a block of twelve data samples received by the DPCM encoder 60. When the first data sample (8) is received, the CLR input of the delay unit 66 is set, so that the first sample is passed directly to the entropy coder 70 without differential coding being applied. For subsequent samples, the CLR input is not set, so the value of the previous data sample is subtracted from the current sample to generate a DPCM output sample. For example, the second sample received has a value of four, from which eight (the previous sample) is subtracted modulo-16 (in a 4-bit system) by the subtracter 62. The subtraction is carried out in modulo-16 arithmetic, so that the corresponding DPCM sample is created as follows:

$$DPCM = 4 - 8 = -4; \; -4 \bmod 16 = 12$$

In the embodiment shown in FIG. 1, data compression is applied separately to luminance (Y) and chrominance (C) components of the input video signal 10, to generate inner data blocks having a luminance data section and a chrominance data section. The luminance data section and the chrominance data section may vary in length between successive inner data blocks, although the sum of their lengths is fixed. The luminance and chrominance data sections represent corresponding portions of respective luminance and chrominance frequency-separated images generated by the frequency decorrelator 40.

Figure 4:
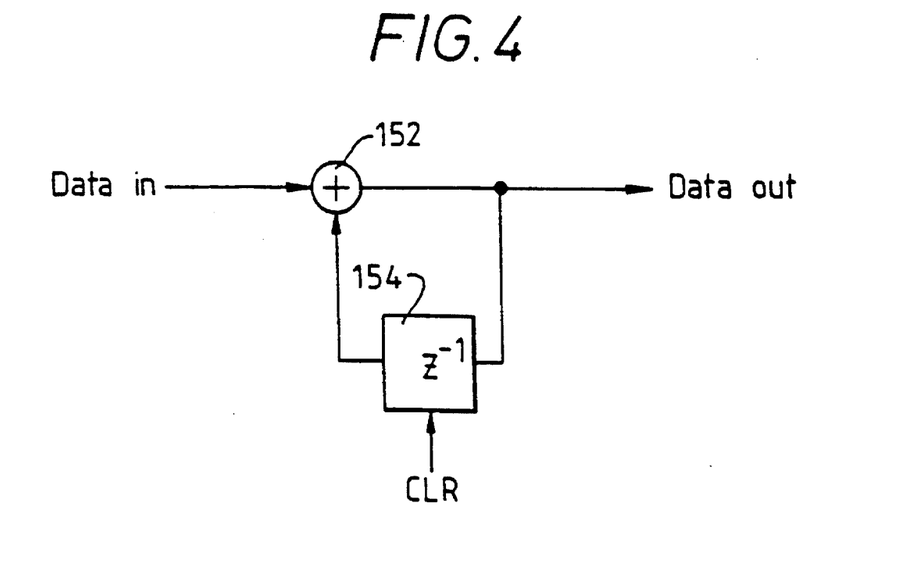
FIG. 4 is a schematic block diagram of a DPCM decoder.

FIG. 4 is a schematic illustration of the DPCM decoder 150, which comprises a modulo-4096 adder 152 and a delay unit 154. The output of the delay unit can be set to zero by applying a CLR signal to the delay unit 154. Each data sample received by the adder 152 is added (modulo-4096) to the output of the delay unit 154 to reconstruct the original sample as supplied to the DPCM encoder 60. The output of the delay unit 154 represents the preceding reconstructed data sample. In this way, the delay unit 154 and adder 152 perform an inverse operation to that of the delay unit 66 and subtracter 62 of the DPCM encoder 60. The CLR input to the delay unit 154 is used to set the output of the delay unit 154 to zero for received data corresponding to all spatial frequency sub-band except the dc sub-band, and for the first (non-DPCM coded) sample of the luminance or chrominance data sections of each inner data block. This latter operation is performed by applying the block strobe generated by the synchronisation detector 120 to the CLR input of the DPCM decoder 150.

Figure 5:
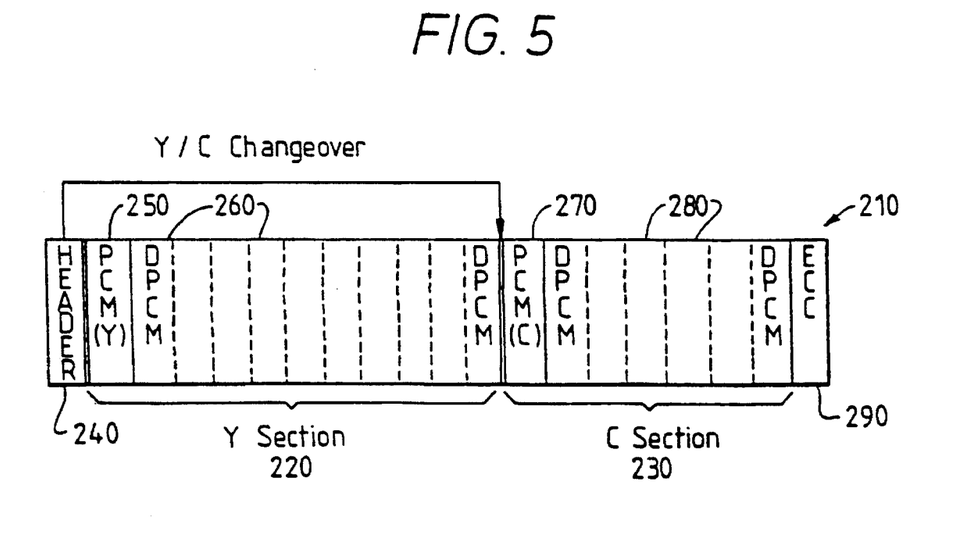
FIG. 5 is a schematic diagram of a formatted "inner" data block.

FIG. 5 is a schematic diagram of an inner data block generated as described above. The overall length of the inner data block 210 is fixed between successive inner data blocks, although the relative sizes of a luminance data section 220 and a chrominance data section 230 may vary depending upon the information content of the luminance and chrominance components of the input video signal. The inner data block 210 comprises a header 240 which includes a pointer indicating the boundary between the luminance data section 220 and the chrominance data section 230. Following the header is the luminance data section 220 which comprises, as described above, a first PCM luminance sample 250 (ie a non-differentially coded sample) followed by a number of luminance DPCM samples 260. Similarly, the chrominance data section 230 comprises a first chrominance PCM sample 270 followed by a number of chrominance DPCM samples 280. An error-correcting code 290 is appended to the inner data block, for use in correction of minor replay errors and detection of all other replay errors in the inner data block.

Figure 6:
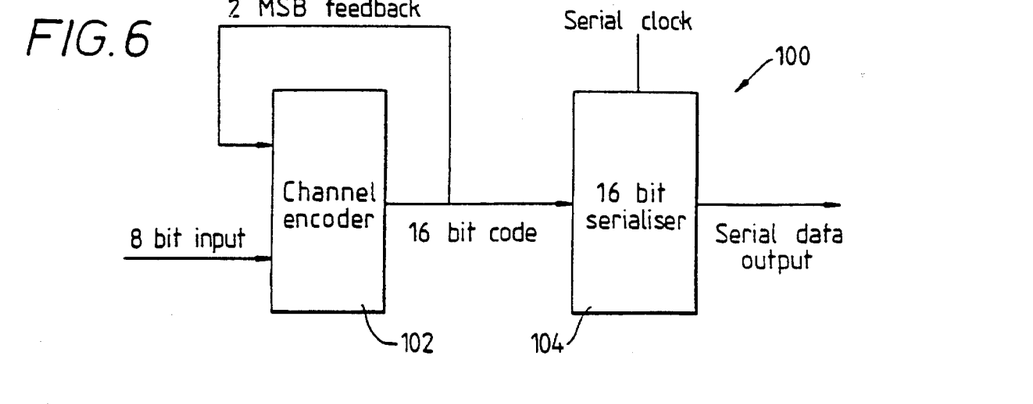
FIG. 6 is a schematic diagram of a channel coder.

FIG. 6 is a schematic diagram of the channel coder 100. The channel coder 100 converts each 8-bit word of each inner data block generated by the block formatter and ECC coder 90 into a 16-bit code word which is supplied serially for recording on the magnetic tape medium 20.

The channel encoder 100 comprises a channel encoder programmable read only memory (PROM) 102 with a register which provides for feedback of the two most significant bits (MSBs) of the 16-bit codes generated by the PROM 102. The 8-bit data words supplied to the PROM 102 and the two bits fed back from the 16-bit code are used to form a 10-bit address, at which address the next 16-bit code to be output is stored.

Each of the possible $2_8$ bit patterns of the 8-bit input signal is associated with a different complementary pair of 16-bit code words in accordance with a code book stored in the PROM 102, though of course only one code word of each complementary pair need be stored in the PROM. Each of the 16-bit code words is selected from the $2^{16}$ possible 16-bit combinations such that each code word has:

1. a maximum transition width of $\leq 6$ bits;

2. a maximum runlength of ≦5 bits at the beginning and end thereof;
3. a minium transition width between the first and last transitions therein of ≧2 bits; and
4. equal numbers of ones and zeros, ie dc balance.

Thus, for each input 8-bit word, there are two possible 16-bit codes, one being the binary complement of the other. Which code word of the pair is output depends upon the preceding output code word as described below. The 16-bit code words are recorded on the magnetic tape medium 20 in serial form, with the least significant bit (LSB) being recorded first. In order to maintain the constraints on minimum and maximum transition width across the boundary between adjacently recorded 16-bit code words, the two most significant bits of each 16-bit code word are fed back and are used to determine which of the complementary pair of code words corresponding to the current 8-bit data word should be used. For example, if the two MSBs of the previous code word were 00, and the two LSBs of the 16-bit code word corresponding to the current 8-bit input data word are 10, then recording of the previous and current data words would lead to the pattern 0010 being recorded on the magnetic tape medium. This would not comply with the minimum transition width constrains identified above so the complement of that 16-bit code corresponding to the current 8-bit input data word is used, with the result that the bit pattern 0001 is recorded across the boundary between the two code words.

The 16-bit cede words are output by the PROM 102 in parallel form and are converted to serial form for recording by a 16-bit serialiser 104.

Figure 7:
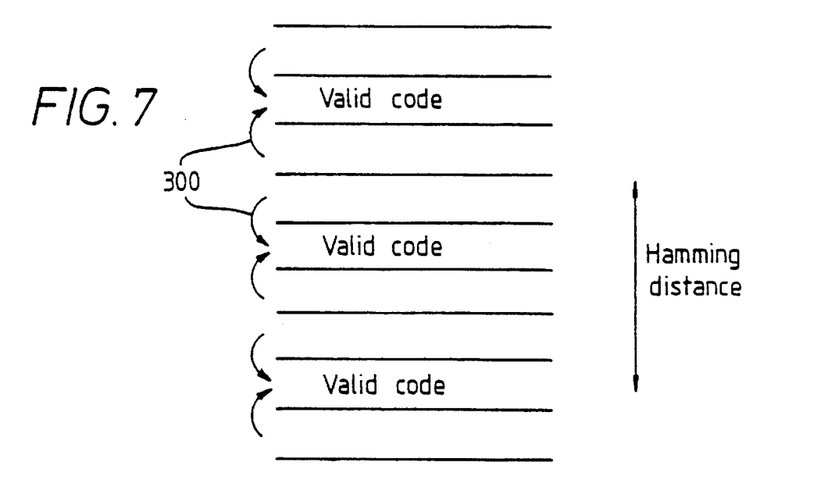
FIG. 7 illustrates the Hamming distance between valid codes output by the channel coder of FIG. 6.

FIG. 7 schematically illustrates the Hamming distance between valid 16-bit code words generated by the channel coder 100. The Hamming distance between the two n-bit words is equal to the number of occasions that bits of corresponding positions in the two words differ. The Hamming distance may be evaluated for two particular n-bit words by counting the number of logical ones in a word formed by the exclusive-OR of the two n-bit words. For example, the Hamming distance for the following two words:

|     |                    |
| --- | ------------------ |
|     | 1011110011000111   |
| XOR | 1011111001100111   |
| =   | 0000001010100000   | is three.

The 16-bit codes output by the channel coder 100 are selected so that the Hamming distance between valid codes is 3, for at least the great majority (~90%) of the codes. This feature is utilised in the present embodiment in that if a 16-bit word is replayed from the tape and supplied to the channel decoder 110 which does not match a valid 16-bit code but differs by a Hamming distance of only one from a valid 16-bit code, then that erroneous replayed code can be corrected with a high probability to the valid code separated by a Hamming distance of one on the assumption that only one bit error has occurred during replay. Such corrections are illustrated by arrows 300 in FIG. 7.

Figure 8A:
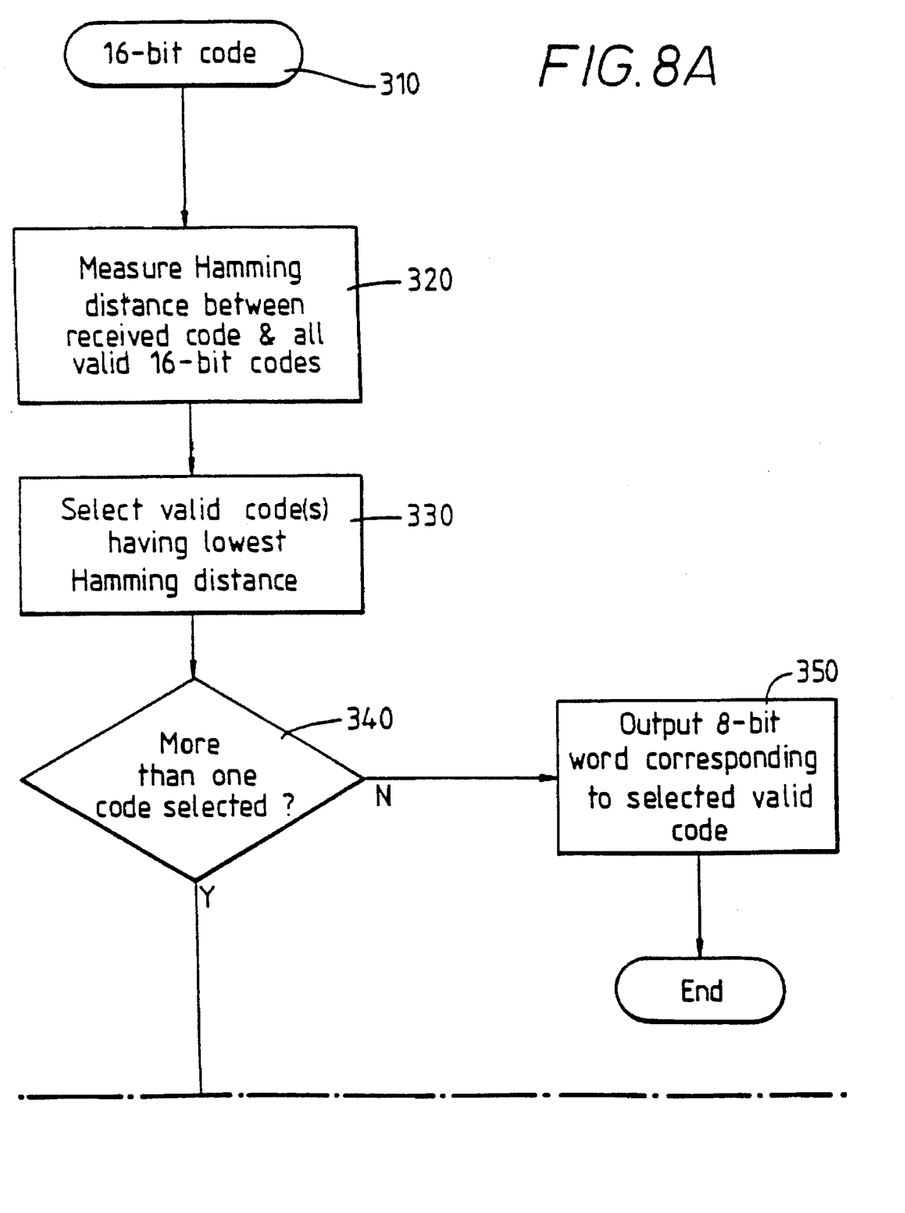
FIG. 8 is a flow diagram showing the operation of a channel decoder.
Figure 8B:
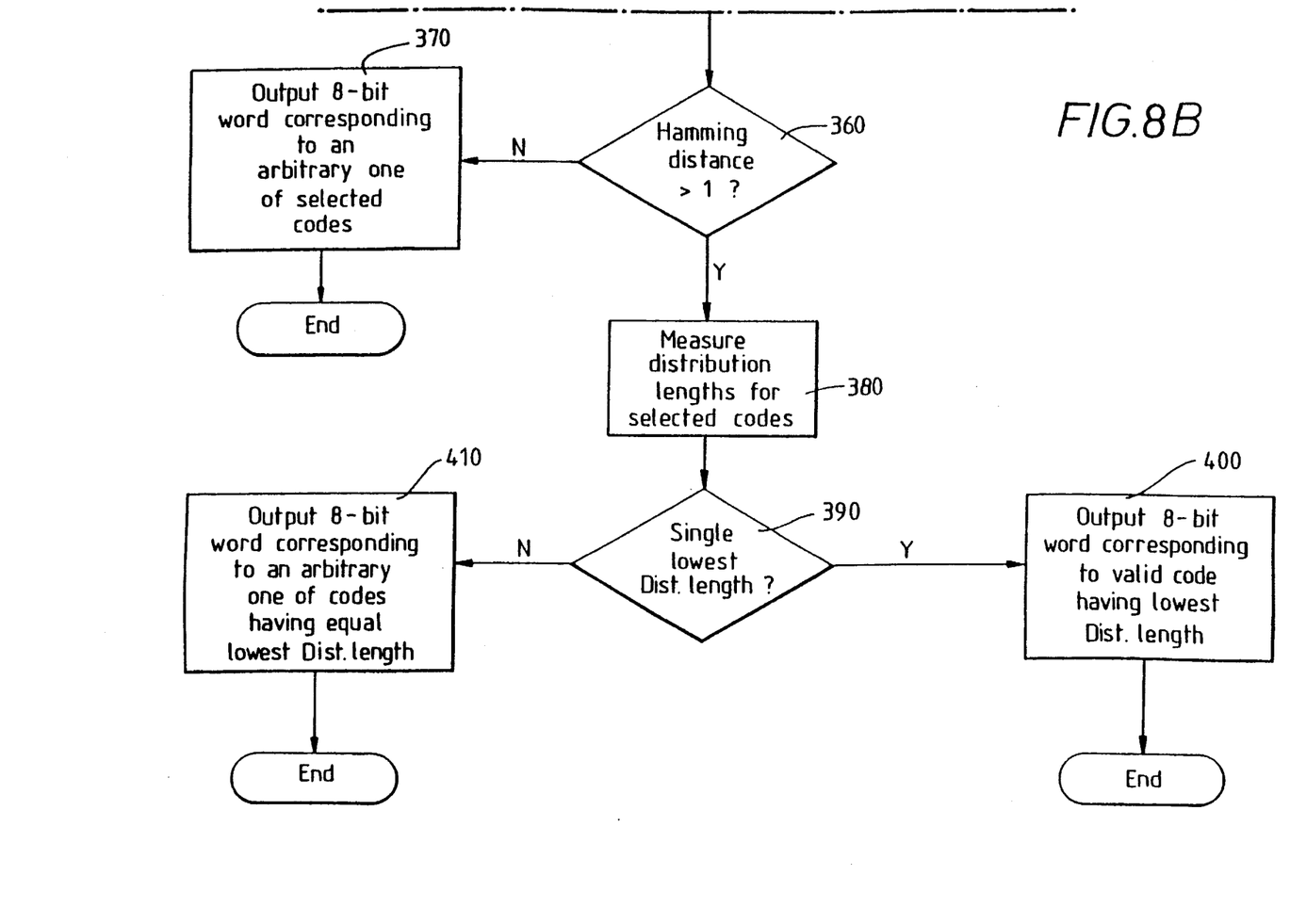

The correction of a high percentage (~90%) of single bit errors described with reference to FIG. 7 is only one part of a larger correction process performed by the channel decoder 100. FIG. 8 is a flow diagram showing the operation of the channel decoder 110.

In FIG. 8, a 16-bit code replayed from the tape medium 20 is received by the channel decoder 110 at a step 310. At a step 320, the Hamming distance between the received 16-bit code and each of the $2^8$ pairs of valid codes corresponding to all of the possible 8-bit data words which could have been supplied to the channel coder 110 is determined.

Because one half (256) of the valid 16-bit codes are the complement of the other half, only Hamming distances up to 8 need be considered. This is because for any code having a Hamming distance (h) of greater than 8 from the currently received code, that code's complement (being another valid code) will have a Hamming distance of 16-h from the currently received code.

At a step 330, the one or more of the valid codes having the lowest Hamming distance from the currently received code ape selected for further processing.

If only one of the valid codes is selected at the step 330 (determined at a step 340) then, at a step 350, the 8-bit data word corresponding to the selected valid code is output by the channel decoder 110 and processing is complete for that received 16-bit code. This corresponds either to an error-free received code (in which case the single Hamming distance would be zero) or to the situation illustrated in FIG. 7, where it is assumed that only a single bit error has occurred and that the corrupted replayed 16-bit code should be replaced by the nearest valid code.

If it is determined at the step 340 that more than one valid code should be selected, in other words that the currently received 16-bit code is equidistant in terms of Hamming distance from two or more valid codes, then at a step 360 a determination is made whether the Hamming distance from those two or more nearest codes is greater than one. If not, then the channel decoder outputs the 8-bit data word corresponding to an arbitrary one of the two or more selected nearest codes at a step 370, and the processing ends.

If, however, the Hamming distance between the currently received code and the two or more nearest valid codes selected at the step 330 is greater than one, then the "distribution length" for the selected codes is determined at a step 380. The distribution length for each of the two or more selected valid codes is equal to the bit separation between the first and last logical ones in a word created by an exclusive-OR of that selected valid code with the currently received 16-bit code. For example, the exclusive-OR sums used in the calculation of the Hamming distance of a received code from two valid 16-bit codes result in the following codes:

|     |                    | Hamming distance | Distribution length |
| --- | ------------------ | ---------------- | ------------------- |
|     | 0001011000000000   | 3                | 3                   |
| and | 0010000000100100   | 3                | 11                  |

At a step 390, a determination is made as to whether a single one of the two or more selected valid codes has a lowest distribution length. If so, then at a step 400 the 8-bit word corresponding to the selected valid code having the lowest distribution is output and the processing of the current 16-bit code is ended. If it is determined at the step 390 that two or more of the selected said codes have equally low distribution lengths, then the 8-bit word corresponding to an arbitrary one of the selected valid codes having the equal lowest distribution length is output at a step 410 and the processing of the current 16-bit code is ended.

Figure 9:
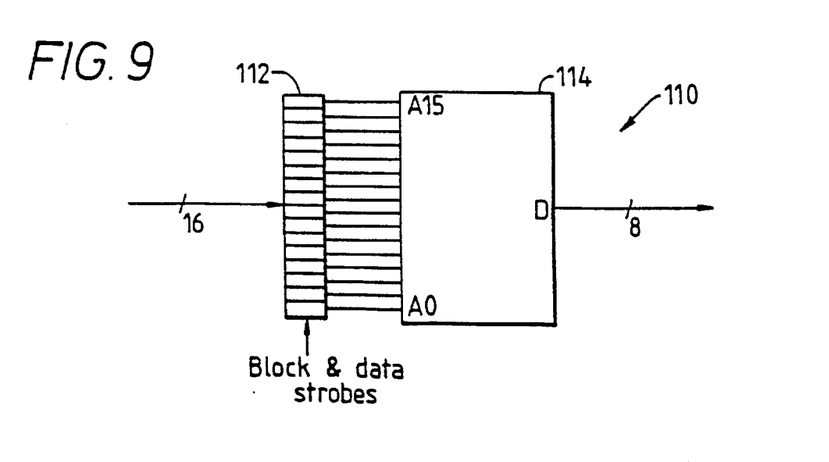
FIG. 9 is a schematic diagram of a channel decoder.

FIG. 9 is a schematic diagram showing one implementation of the channel decoder 110. The replayed data from the tape medium is loaded into a 16-bit latch 112 under the control of the block and data strobes which are used to indicate the start of each 16-bit code word. The contents of the latch 112 are supplied as address inputs to a PROM 114, which has been programmed according to the series of steps shown in FIG. 8. Accordingly, for any of the $2^{16}$ possible received 16-bit code words, the appropriate 8-bit data word which would be generated by the steps of FIG. 8 is stored at an address corresponding to the 16-bits of that code word. The output of the PROM 114 is a parallel 8-bit data stream comprising successive 8-bit data words.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for decoding an input digital signal comprising successive n-bit groups of data bits by replacing said successive n-bit groups with respective ones from an ensemble of m-bit data words, each said m-bit data word having at least one associated valid n-bit code word, where n is greater than m, said apparatus comprising:

means for determining a Hamming distance between a current n-bit group of said input digital signal and each of said valid n-bit code words;

means for detecting whether one or more of said valid n-bit code words each have the lowest Hamming distance from said current n-bit group;

means, responsive to a detection that only one of said valid n-bit code words has the lowest Hamming distance from said current n-bit group, for replacing said current n-bit group with an m-bit data word from said ensemble of m-bit data words for which said Hamming distance between a valid n-bit code word associated with said m-bit data word and said current n-bit group is the lowest; and means, responsive to a detection that more than one of said valid n-bit code words have said lowest Hamming distance from said current n-bit group, for replacing said current n-bit group with an m-bit data word associated with one of said more than one valid n-bit code words having said lowest Hamming distance from said current n-bit group when said lowest Hamming distance is equal to one and for replacing said current n-bit group with an m-bit data word for which a bit separation between a valid n-bit code word associated with said m-bit data word and said current group is the lowest when said lowest Hamming distance is not equal to one.

2. Apparatus according to claim 1, wherein n is 16 and m is 8.

3. Apparatus according to claim 2, wherein said ensemble of m-bit data words comprises 256 discrete 8-bit data words.

4. Apparatus according to claim 1, wherein each said valid n-bit code word associated with an m-bit data word has a maximum run length of $L_{max}$ and a minimum run length of $L_{min}$.

5. Apparatus according to claim 4, wherein $L_{max}$ is 6 and $L_{min}$ is 2.

6. Apparatus according to claim 1, comprising:

a read only memory;

means for supplying said current n-bit group as an n-bit address to said read only memory; and means for reading an m-bit data word from said n-bit address in said read only memory for use in replacing said current n-bit group.

7. Apparatus according to claim 1, wherein each said m-bit data word from said ensemble of m-bit data words has two binary-complementary associated valid n-bit code words.

8. Digital video record/replay apparatus comprising apparatus according to claim 1.

9. A method of decoding an input digital signal comprising successive n-bit groups of data bits by replacing said successive n-bit groups with respective ones from an ensemble of m-bit data words, each said m-bit data word having at least one associated valid n-bit code word, where n is greater than m, said method comprising the steps of:

determining a Hamming distance between a current n-bit group of said input digital signal and each of said valid n-bit code words;

detecting whether one or more of said valid n-bit code words each have the lowest Hamming distance from said current n-bit group;

replacing said current n-bit group with an m-bit data word from said ensemble of m-bit data words for which said Hamming distance between a valid n-bit code word associated with said m-bit data word and said current n-bit group is the lowest when only one of said valid n-bit code words has the lowest Hamming distance from said current n-bit group; and replacing, when more than one of said valid n-bit code words have said lowest Hamming distance from said current n-bit group, (i) said current n-bit group with an m-bit data word associated with one of said more than one valid n-bit code words having said lowest Hamming distance from said current n-bit group when said lowest Hamming distance is equal to one and (ii) said current n-bit group with an m-bit data word for which a bit separation between a valid n-bit code word associated with said m-bit data word and said current group is the lowest when said lowest Hamming distance is not equal to one.

10. Apparatus for decoding an input digital signal comprising successive n-bit groups of data bits by replacing said successive n-bit groups with respective ones from an ensemble of m-bit data words, each said m-bit data word having at least one associated valid n-bit code word, where n is greater than m, said apparatus comprising:

means for determining a Hamming distance between a current n-bit group of said input digital signal and each of said valid n-bit code words;

means for replacing said current n-bit group with an m-bit data word from said ensemble of m-bit data words for which said Hamming distance between a valid n-bit code word associated with said m-bit data word and said current n-bit group is the lowest;

means for detecting whether two or more of said valid n-bit code words have said lowest Hamming distance from said current n-bit group;

means, responsive to a detection that two or more of said valid n-bit code words have said lowest Hamming distance from said current n-bit group, for detecting whether said lowest Hamming distance is equal to one and, if so, for replacing said current n-bit group with an m-bit data word associated with one of said two or more valid n-bit code words having said lowest Hamming distance from said current n-bit group;

means, responsive to a detection that said lowest Hamming distance is not equal to one, for detecting a bit separation of bit differences between said current n-bit group and said two or more valid n-bit code words; and means for replacing said current n-bit group with an m-bit data word for which said bit separation between a valid n-bit code word associated with said m-bit data word and said current group is the lowest.

11. Apparatus for decoding an input digital signal comprising successive n-bit groups of data bits by replacing said successive n-bit groups with respective ones from an ensemble of m-bit data words, each said m-bit data word having at least one associated valid n-bit code word, where n is greater than m, said apparatus comprising:

- means for determining a Hamming distance between a current n-bit group of said input digital signal and each of said valid n-bit code words;
- means for detecting whether two or more of said valid n-bit code words each have the lowest Hamming distance from said current n-bit group and for determining whether said lowest Hamming distance is more than one;
- means, responsive to a determination that said lowest Hamming distance is more than one, for detecting bit separations between a predetermined type of bits in each respective group of bits formed from said current n-bit group and each of said two or more valid n-bit code words; and
- means for replacing said current n-bit group with an m-bit data word having a lowest value of said bit separation.

12. Apparatus according to claim 11, wherein said means for detecting bit separations includes means for forming each said group of bits from said current n-bit group and each of said two or more valid n-bit code words by processing said current n-bit group and each of said two or more valid n-bit code words with an exclusive-OR technique.

13. Apparatus according to claim 12, wherein said predetermined type of bits is a logical one data bit.

* * * * *